May 17, 1932.  A. F. MASURY  1,858,781
TRIANGULAR DRIVE FOR MOTOR VEHICLES
Filed Aug. 24, 1929  2 Sheets-Sheet 1

Inventor:
Alfred F. Masury
By his Attorneys
Redding, Greeley, O'Shea & Campbell

Inventor:
Alfred F. Masury

Patented May 17, 1932

1,858,781

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

TRIANGULAR DRIVE FOR MOTOR VEHICLES

Application filed August 24, 1929. Serial No. 388,116.

The present invention relates to drives for motor vehicles and embodies, more specifically, an improved drive for a plurality of wheels mounted upon a plurality of axles at one end of a motor vehicle.

The development of multi-wheel drives has heretofore utilized the conventional type of axle which extends transversely across the frame and is an unsprung element. In addition to increasing the unsprung weight of the vehicle, such constructions decrease the clearance between the road surface and the frame, requiring the frame to be elevated considerably, and the center of gravity thereof correspondingly raised. There has recently been provided a form of drive in which the driving axles are individually mounted upon the frame and the drive transmitted thereto independently of the cooperating driving wheels in so far as the unsprung portion of the drive is concerned.

It is with the last mentioned type of drive that the present invention is concerned and it is contemplated herein to afford a design which incorporates a plurality of individually mounted wheels in a construction which is provided with an improved mechanism for transmitting the drives to such independently mounted wheels.

An object of the invention, therefore, is to provide an improved mechanism for transmitting the drive from the propeller shaft to a plurality of individually mounted wheels.

A further object of the invention is to provide a drive of the above character in which the weight of the unsprung elements for transmitting the drive is considerably reduced and the center of gravity of the frame lowered.

A further object of the invention is to provide a drive for a plurality of wheels mounted in the above manner, such drive increasing the clearance between the road surface and the frame elements.

Further objects, not specifically enumerated above, will be apparent as the invention is described in greater detail in connection with the accompanying drawings, wherein.

Figure 1:
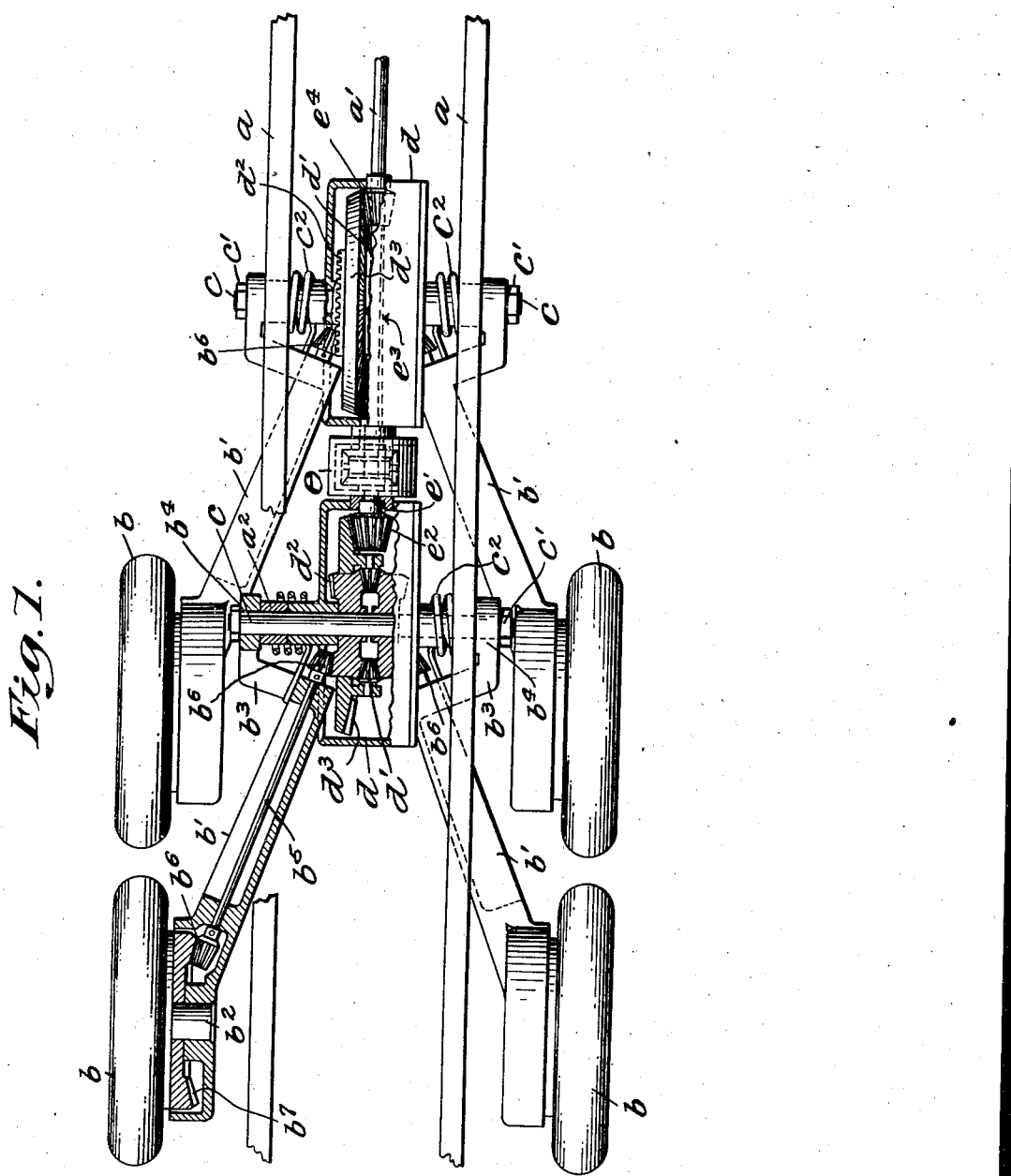
Figure 1 is a plan view, partly broken away and in section, showing a drive constructed in accordance with the present invention.
Figure 2:
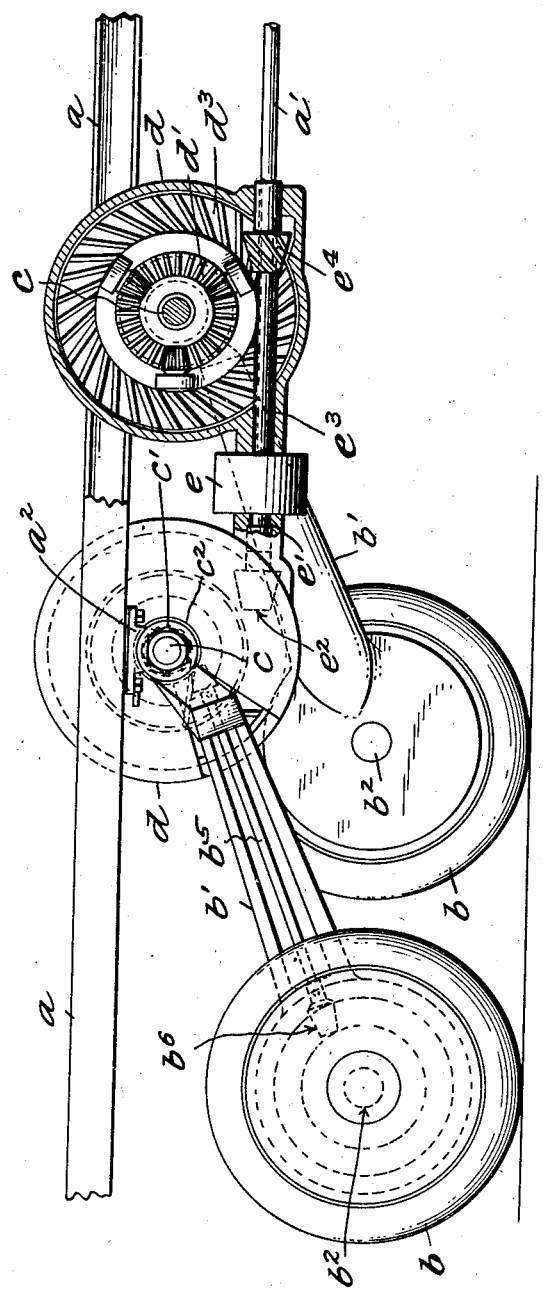
Figure 2 is a view in side elevation, partly broke away and in section, showing the manner in which the wheels are mounted upon the frame.

Referring to the above drawings, $a$ designates the longitudinal frame members of a motor vehicle upon which a propeller shaft $a'$ is carried for transmitting the drive from an internal combustion engine to the driving wheels.

Driving wheels $b$ are mounted upon spiders $b'$ which are journaled upon anchor tubes $c$, carried in brackets $a^2$ on the under portion of the longitudinal frame members $a$. The spiders $b'$ are provided with stub shafts $b^2$ upon which the wheels are mounted and offset arms $b^3$ are provided with extensions $b^4$ which are journaled upon the anchor tubes $c$. Nuts $c'$ may be provided for preventing the extensions $b^4$ from slipping off of the anchor tubes, and torsional springs $c^2$ engage the spiders to mount the frame yieldingly thereon and support its weight in the desired position.

Differential housings $d$ are journaled on the anchor tubes and are provided with differential mechanisms $d'$ having driving ring gears $d^2$ between which power is divided. Shafts $b^5$ are carried within the spiders $b'$ and formed with bevel gears $b^6$, one of which gears engages the corresponding driving gear $d^2$ on the differential mechanism $d'$, and the other of such gears engaging a ring gear $b^7$ on the corresponding wheel. In this manner, the drive is properly apportioned between the respective wheels from the differential mechanism on the respective anchor tubes. The propeller shaft $a'$ drives through to a differential $e$ which apportions power between the forward and rear differential mechanisms $d'$. The drive from the differential $e$ to the rear differential is transmitted through a stub shaft $e'$ and bevel gear $e^2$ to the carrier $d^3$, while the drive to the forward differential is transmitted through a sleeve $e^3$ and corresponding pinion $e^4$ in a well known manner. The forward of the rear driving wheels are mounted upon the forward anchor tube in a manner similar to that in which the rear driving wheels are mounted. Two similar arrangements are thus provided to support and drive each pair of wheels and it will be seen that the resulting construction affords greater clearance for the vehicle than heretofore available, at the same time effectively transmitting the drive of the respective individually mounted driving wheels. These wheels are mounted to accommodate all irregularities in the road surface and are independently yieldable without impairing the drive transmitted thereto.

While the invention has been shown as embodied in the specific construction illustrated in the accompanying drawings, it is obvious that the elements thereof may be changed in form, design and arrangement of parts without departing from the scope of the present invention as defined in the appended claim.

What I claim is:

A drive for motor vehicles comprising a frame, a drive shaft thereon, a plurality of pairs of driving wheels, spaced anchor tubes on the frame, a differential carried by each tube, a third differential driven by the drive shaft and driving the first differentials, spiders journaled on the tubes at either sides of the differentials, means to mount the wheels on the spiders, and angular drive shafts carried by the spiders for transmitting the drive from the differentials to the wheels.

This specification signed this 21 day of August, A. D. 1929.

ALFRED F. MASURY.